May 7, 1963 L. D. DUNN 3,088,643
COVER
Filed March 2, 1961
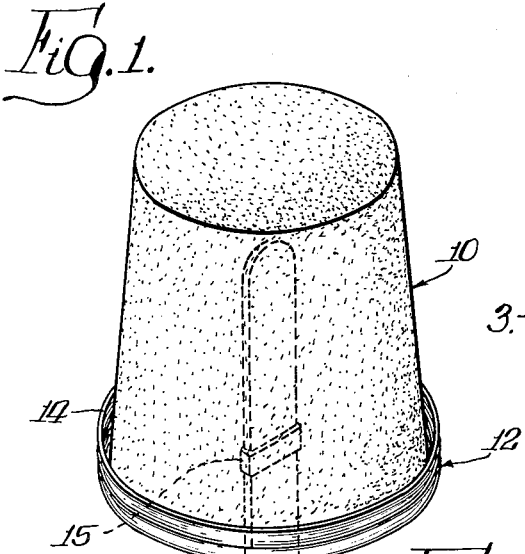
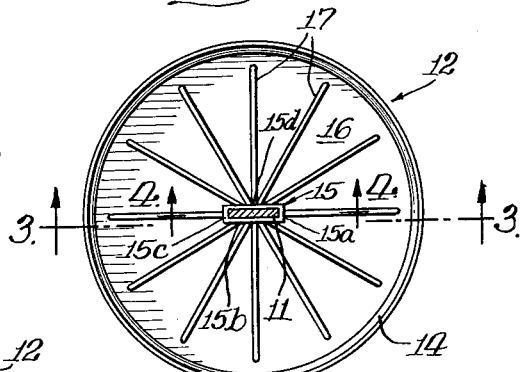
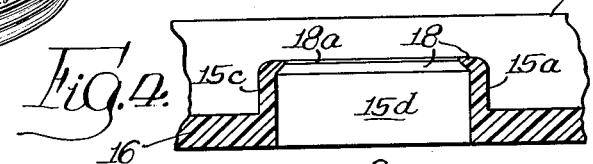
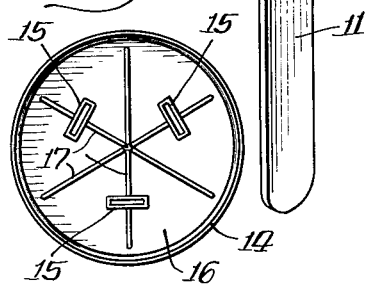
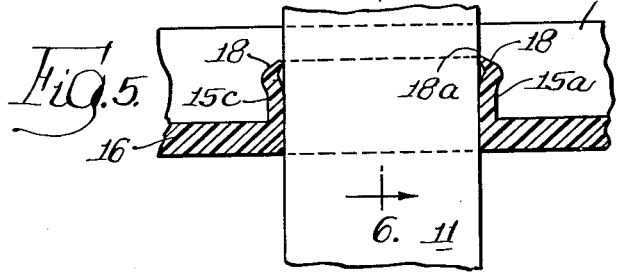
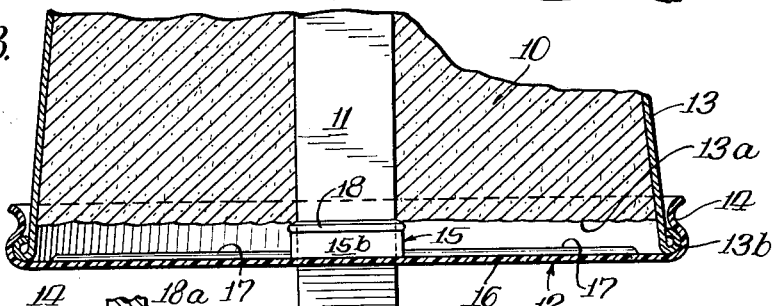
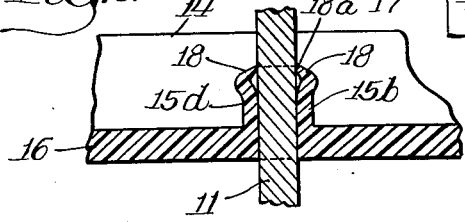
INVENTOR.
Lyman D. Dunn.
BY Hofgren, Brady,
Wegner, Allen & Stellman Atty's.

United States Patent Office 3,088,643
Patented May 7, 1963

3,088,643
COVER
Lyman D. Dunn, Chicago, Ill., assignor to Aqueous Patents, Inc., Chicago, Ill., a corporation of Illinois
Filed Mar. 2, 1961, Ser. No. 92,887
4 Claims. (Cl. 229—1.5)

This invention relates to a closure for a container and a drip guard, and more particularly to a container cover which when in place on a freezing container provides a substantially liquid retaining closure for the container, and which also is adapted to act as a drip guard for a frozen confection while it is being consumed.

Frozen confections made of aqueous flavored solutions are fairly commonly distributed in drug stores, roadside stands and the like. Most of these are produced by a central manufacturing and supply organization and are not made on the spot. This is true because of the difficulties encountered in freezing such materials into desirable shape. Furthermore, most of these frozen confections have the distinct disadvantage of melting and dripping on the consumer's hand or clothing while they are being eaten.

The cover or closure of this invention is designed to circumvent or overcome these problems, and is designed to fit on a freezing container such as a cup to provide a substantially liquid-proof closure. In such an arrangement, the aqueous solution can be introduced into the container, the cover applied, and the frozen confection prepared on the spot with little danger of spilling. On removal of the confection from the container, the cover acts as a drip guard to prevent dripping of the melting confection on the consumer's hands and clothing.

It is therefore an object of this invention to provide a cover or closure such as that described.

It is another object of this invention to provide such a cover which can be produced of relatively inexpensive material and can be easily handled and used.

It is still a further object of this invention to provide an article of manufacture adapted to be used as a substantially liquid retaining closure for a freezing container and as a drip guard for a frozen confection supported on an elongated implement comprising a base having means adjacent its outer perimeter for trapping liquid, and a substantially centrally located implement receiving and passing section, the section having upstanding walls each with a resilient gripping means, the area defined by the means being less than the cross-sectional area of the implement whereby the passage of the implement urges the means outwardly thereof, creating a liquid retaining seal between the implement and the means.

Other objects and advantages of this invention will become apparent from the following description taken together with the accompanying drawings.

Of the drawings:

FIGURE 1 is a perspective view showing a frozen confection supported on a stick with the stick passing through the cover of this invention;

FIGURE 2 is a top plan view of the cover of this invention;

FIGURE 3 is an enlarged partial sectional view taken along the line 3—3 of FIGURE 2;

FIGURES 4 and 5 are greatly enlarged partial sectional views both taken substantially along the line 4—4 of FIGURE 2, FIGURE 4 showing the construction without a stick and FIGURE 5 showing the construction with a stick;

FIGURE 6 is a partial sectional view taken along the line 6—6 of FIGURE 5; and

FIGURE 7 is a reduced size plan view of another embodiment of the cover of this invention.

Referring now to the drawings, FIGURE 1 shows a frozen confection 10 which in this instance is substantially cup-shaped, mounted or frozen on a stick 11, the stick passing through the cover 12. In this view, it can clearly be seen how the cover 12 acts as a drip guard for the frozen confection to prevent the thawed liquid from getting on the consumer.

The confection is formed by partially filling a cup 13 to the level 13a shown in FIGURE 3 with an aqueous solution of a flavored beverage. The stick 11 is then inserted through the cover 12 as presently will be described and the cover is put on the container 13. It will be noted as in FIGURE 3, that the upstanding or edge portion 14 of the cover is S-shaped in configuration and is resilient as will be described so that it grips the bead 13b of the cover 13. This provides a substantially liquid-proof closure at this point. During freezing, the cup is set on its base (not shown) with the stick 11 upstanding. After the liquid has been converted to the frozen state, the container can, of course, be set in any position.

Turning now to the cover 12 itself, as can be seen in FIGURE 2, it includes the upstanding portion 14 already mentioned and a transversely extending central portion 15 which is supported by the base 16. The base is reinforced by a plurality of radially extending ribs 17. The central section 15 includes upstanding side walls 15a, 15b, 15c and 15d. The walls 15a, 15b, 15c and 15d are not quite as high as the upstanding portion 14 but are of sufficient height to allow operation of the cover in the manner proposed. Near the top of each of the walls is a resilient inturned portion which due to its similarity will be numbered 18. Each of the walls has this inturned portion which terminates in a substantially knife-edge section 18a. It will be noted in FIGURE 4 that the inturned portion 18 defines an area which is less than the area defined by the remainder of the walls. The area defined by the walls is substantially equal to the cross-sectional area of the stick 11 so that when the stick 11 is inserted through the central portion 15, the inturned portion 18 will be forced outwardly thereby gripping the stick 11 and also providing a substantially liquid-proof seal. Alternately, this portion 15 can be constructed so that the entire area defined by the walls is less than the cross-sectional area of the stick 11.

As previously mentioned, the upstanding portion 14 and the central portion 15 are resilient in operation. This is true because the cover 12 is constructed of a resilient material such as, for example, a resilient plastic. Polyethylene is a very satisfactory material for producing the cover of this invention.

As previously described, when the cover is in place on the container 13, the resilient upstanding S-shaped portion 14 makes a substantially liquid-proof seal with the bead 13. Because of the construction of the central portion 15, and its substantially liquid-proof seal with the stick 11, the liquid is prevented from escaping through this route when the cover is in place and before the confection is frozen. Once the confection 10 is frozen it may be removed from the cup and while supported on the stick 11 eaten by an individual. During this time, the confection will begin to melt. Any liquid resulting from this melting will be trapped by the cover 12. A substantial volume is provided in the cover due to the height of the walls 14 and it is unimportant whether or not the liquid rises to a depth greater than the height of the walls 15 of this central portion since the connection between the inturned portion 18 and the stick 11 is still substantially liquid-proof. Thus the cover acts as a drip guard protecting the consumer.

FIGURE 7 shows another embodiment of the cover having a plurality or in this case, three portions 15 and a plurality of strengthening ribs 17. This construction permits the production of three frozen confections at one time in the same cup. The cup is provided with partitions (not shown) to freeze the products separately.

The cover of this invention can be constructed to fit square or oblong cups or containers, it being only necessary to change the outer shape of the cover. In like manner the central portions 15 can be round, square or oblong to accommodate different shaped sticks.

Having thus described my invention as related to the embodiments shown in the accompanying drawings, it is my intention that the invention be not limited by any of the details of description unless otherwise specified, but rather be construed broadly within its spirit and scope as set out in the accompanying claims.

I claim:
1. An article of manufacture adapted to be used as a substantially liquid retaining closure for a freezing container and as a drip guard for a frozen confection supported on an elongated implement, comprising: a base having an upstanding liquid trapping edge portion; and a substantially centrally located implement receiving and passing section, said section having upstanding walls defining a passage, each of said walls with a resilient portion inturned into said passage and extending substantially the full length of said walls, the area defined by said inturned portions being slightly less than the cross-sectional area of the remainder of said passage and of an implement for supporting said confection, the cross-sectional area of said implement being substantially equal to the cross-sectional area of the remainder of said passage whereby the introduction of said implement urges said portions outwardly thereby creating a liquid retaining seal between said implement and said section and said passage supports said implement.

2. An article of manufacture adapted to be used as a substantially liquid retaining closure for a freezing container and as a drip guard for a frozen confection supported on an elongated implement, comprising: in one piece construction, a base having an upstanding liquid trapping edge portion; and a substantially centrally located implement receiving and passing section, said section having upstanding walls defining a passage, each of said walls with a resilient finger located adjacent the top thereof inturned into said passage and extending substantially the full length of said walls, the area defined by said inturned finger being slightly less than the cross-sectional area of the remainder of said passage and of an implement for supporting said confection whereby the introduction of said implement urges said fingers outwardly thereby creating a liquid retaining seal between said implement and said section and said passage supports said implement.

3. An article of manufacture adapted to be used as a substantially liquid retaining closure for a freezing container and as a drip guard for a frozen confection supported on an implement, comprising: in one piece construction, a base having an upstanding liquid trapping edge portion; and a substantially centrally located implement receiving and passing section, said section having upstanding walls defining a passage, each of said walls with a resilient finger located adjacent the top thereof inturned into said passage and extending substantially the full length of said walls, said finger having knife-like edges, the area defined by said inturned finger being slightly less than the cross-sectional area of the remainder of said passage and of an implement for supporting said confection whereby the introduction of said implement urges said fingers outwardly thereby creating a liquid retaining seal between said implement and said section and said passage supports said implement.

4. In combination, a cup having a lip about its opening, said cup being adapted to be used for holding a frozen confection; an elongated implement adapted to be frozen in said frozen confection and to support the same; a substantially liquid retaining closure for said cup, said closure also being adapted to be used as a drip guard for said frozen confection, said closure comprising a base having an upstanding liquid trapping each portion, said edge portion being adapted to grip the top outer lip of said cup in substantially liquid-proof closure, and a substantially centrally located implement received and passing section, said section having upstanding walls defining a passage, each of said walls with a resilient portion inturned into said passage and extending substantially the full length of said walls, the area defined by said inturned portions being slightly less than the cross-sectional area of the remainder of said passage and of said implement whereby the introduction of said implement urges said portions outwardly thereby creating a liquid retaining seal between said implement and said section and said passage supports said implement.

References Cited in the file of this patent
UNITED STATES PATENTS

| 1,882,290 | Meagher | Oct. 11, 1932 |
| 1,952,813 | McDowell | Mar. 27, 1934 |
| 2,321,519 | Rubinoff | June 8, 1943 |
| 2,803,550 | Ackalusky | Aug. 20, 1957 |